United States Patent [19]

Pelling

[11] Patent Number: 4,756,145
[45] Date of Patent: Jul. 12, 1988

[54] ANIMAL GOGGLES

[76] Inventor: Michael G. Pelling, 86 Mein Street, Hendra, Queensland 4011, Australia

[21] Appl. No.: 932,548
[22] PCT Filed: Feb. 11, 1986
[86] PCT No.: PCT/AU86/00034
 § 371 Date: Oct. 17, 1986
 § 102(e) Date: Oct. 17, 1986
[87] PCT Pub. No.: WO86/04886
 PCT Pub. Date: Aug. 28, 1986

[30] Foreign Application Priority Data

Feb. 21, 1985 [AU] Australia .............................. PG9390
Mar. 8, 1985 [AU] Australia .............................. PG9617

[51] Int. Cl.$^4$ ................................................ B68C 5/00
[52] U.S. Cl. ............................................ 54/80; 119/104
[58] Field of Search .................. 54/80, 81; 119/104; 2/4, 15, 440

[56] References Cited

U.S. PATENT DOCUMENTS

| 287,885 | 11/1883 | Sumner | 119/104 |
| 2,143,856 | 1/1939 | Biggs | 2/440 |
| 2,407,029 | 9/1946 | Miller | 54/80 |
| 2,871,642 | 2/1959 | Damone | 54/80 |
| 3,104,508 | 9/1963 | O'Hare | 54/81 |
| 3,753,334 | 8/1973 | Blessing | 54/80 |
| 4,040,239 | 8/1977 | Powell | 54/80 |
| 4,148,172 | 4/1979 | Fer | 54/80 |
| 4,178,742 | 12/1979 | Longfellow | 54/80 |
| 4,404,789 | 9/1983 | Denning | 54/80 |
| 4,480,429 | 11/1984 | Knox | 54/80 |
| 4,581,877 | 4/1986 | Wilber | 54/80 |

FOREIGN PATENT DOCUMENTS

| 65140/80 | 6/1981 | Australia . | |
| 896119 | 2/1945 | France | 2/15 |

Primary Examiner—Robert P. Swiatek
Attorney, Agent, or Firm—Foley & Lardner, Schwartz, Jeffery, Schwaab, Mack, Blumenthal & Evans

[57] ABSTRACT

Animal goggles include a flexible hood for fitting closely and being secured on an animal's head, and with eye holes to each of which is fitted a mesh eye guard projecting forwardly from the periphery of the eye hole. The periphery of each eye guard is outwardly flanged for releasable engagement in an annnular recess formed from the inner periphery of a flexible and resiliently deformable edging ring about each eye hole, and associated with each edging ring is an arcuate retainer in which the base of a blindker may be removably engaged to the outer side of the eye hole and eye guard.

7 Claims, 1 Drawing Sheet

ANIMAL GOGGLES

BACKGROUND OF THE INVENTION (1) Field of the Invention

This invention relates to animal goggles.

(2) Prior Art

Race horses sometimes suffer severe eye injuries and even blindness because of sand or earth thrown up by other horses, or because of being accidentally struck by a jockey's whip. Eye injuries are also liable to occur to polo ponies and to racing dogs. Furthermore, animals suffering from eye infections are likely to have their cndition worsened by flies, which may also transmit the infection to other animals.

SUMMARY OF THE PRESENT INVENTION

The present invention has been devised with the general object of providing animal goggles capable of obviating or materially reducing such occurrences.

With the foregoing and other objects in view, the invention resides broadly in animal goggles including a flexible hood with eye holes for fitting about the eyes and over adjacent parts of the animal's head; means for releasably securing the hood on the head; a pair of mesh eye guards; and eye guard attachment means for securing each eye guard to the hood to project forwardly from the peripheral part of an eye hole. Preferably each mesh eye guard is dome-shaped and formed with a peripheral base flange, its attachment means being a flexible and resiliently deformable edging ring about an eye hole and formed, from its inner periphery, with an annular recess in which the eye guard base flange may be slidably engaged. The hood may have retainer members for releasably holding blinkers at the outer sides of the eye guards. Other features of the invention will become apparent from the following description.

BRIEF DESCRIPTION OF THE DRAWINGS

In order that the invention may be readily understood and carried into practical effect, reference is now made to the accompanying drawings, wherein.

DETAILED DESCRIPTION OF THE PREFERRED EMBODIMENTS

Figure 1:
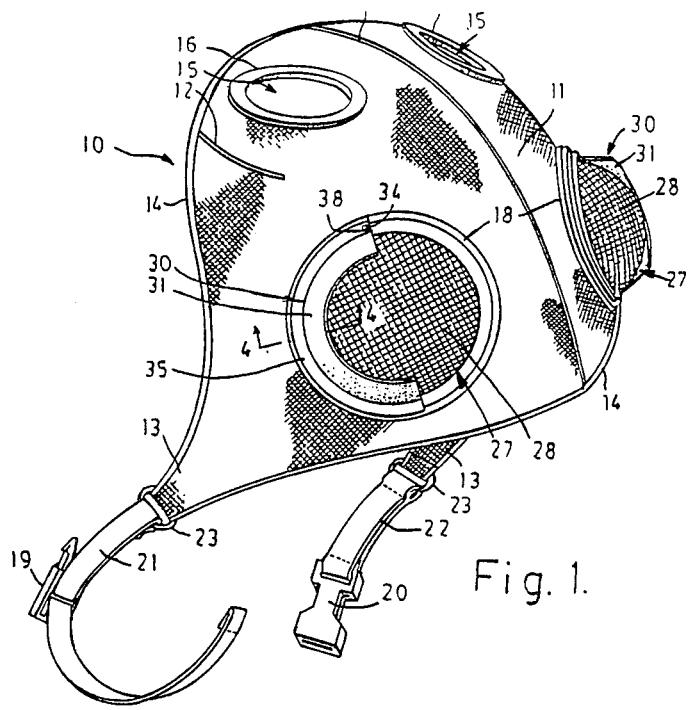
FIG. 1 is a perspective view of goggles according to the invention, for use on a horse.
Figure 2:
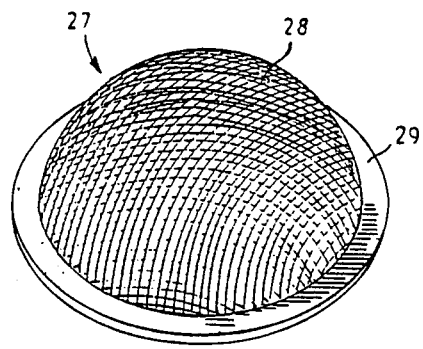
FIG. 2 is a perspective view of one of the eyeguards of the goggles shown in FIG. 1.
Figure 3:
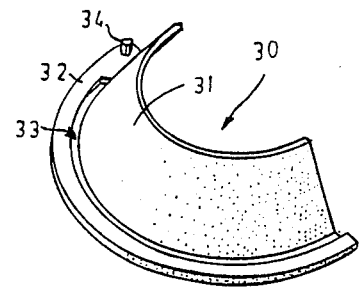
FIG. 3 shows in perspective one of the detachable blinker fittings of the goggles.
Figure 4:
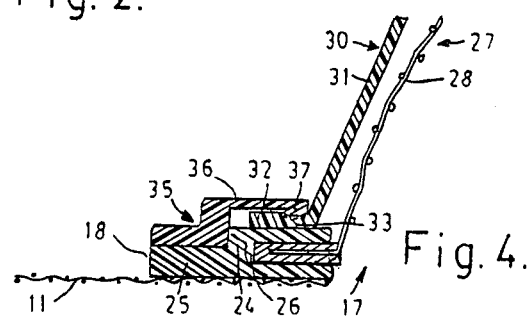
FIG. 4 is a cross-sectional detail drawing taken along line 4—4 in FIG. 1.

The goggles illustrated include a hood 10 which may suitably consist mainly of a section 11 of a fairly fine open-weave mesh of pliable plastics material shaped by being cut appropriately and, by well-known plastics welding techniques, re-joined along lines 12. The hood is formed with tapered strap attachment pieces 13 at both sides, and it has a reinforced edge 14.

In the upper part of the hood there are formed two circular ear holes 15 with flexible reinforcing edgings 16 welded to the hood.

Circular eye holes 17 are formed in the hood and welded or otherwise secured about each is an edging ring 18 which will later be more fully described.

The hood is such that it may be fitted closely on the head of a horse (not shown), its ears passing through the ear holes 15. The hood may be secured firmly in place by a quick-release catch of well-known type, comprising a male piece 19 and female piece 20, the one being connected adjustably to a strap 21, the other being fixed to an elastic strap 22, the two straps 22 and 21 being secured to and leading from D-pieces 23 fixed to the ends of the strap attachment pieces 13 of the hood 10.

Each of the eye hole edging rings 18 is of a flexible material, its inner part 24 being of greater thickness than its outer part 25, and being formed, from its inner periphery, with an annular groove or recess 26.

Two similar eye guards 27 are removably engaged with the two eye hole edging rings 18. Each of the guards consists of a domed mesh section 28, the edge portion of the mesh being out-turned and moulded into an annular peripheral flange 29. The domed mesh section 28 may suitably be of stainless steel wire mesh finished in matt black or other colour to reduce reflection of light from the mesh. The gauge of the mesh is preferably as fine as is consistent with inability, under normal circumstances, to retain a film of water across its interstices. A mesh with openings of about 2.5 mm. square has been found satisfactory.

Each eye guard 27 is fitted removably to an eye hole 17 by engaging its peripheral flange 29 in the annular recess 26 of the flexible edging ring 18 of the eye hole. A small part of the flange is first introduced to the recess and then, by rotation of the eye guard, the remainder of the flange is progressively fed into the recess, the edging ring being resiliently deformable.

The hood 10 may be fitted with a pair of blinkers 30. Each blinker, which may be of a fairly rigid plastics material, comprises a semi-frusto-conical piece 31 with an outwardly extending base flange 32, an arcuate groove 33 being formed in the base flange 32 adjacent to the piece 31, and extending from one end of the flange to a position near to its other end, where a stop pin 34 extends from the flange.

Each of the blinkers 30 is releasably engageable in a blinker retainer 35 which is a fairly rigid semicircular element welded or otherwise secured on the outer part 25 of the rear half of an eye hole edging ring 18. The blinker retainer 35 has a top flange 36 spaced from the inner part 24 of the eye hole edging ring 18. At its inner edge portion this top flange 36 has an arcuate tongue 37 which, when the blinker 30 is slidably engaged with the blinker retainer, engages closely in the arcuate groove 33 in the blinker base flange 32. When the blinker is fully engaged with the blinker retainer, the stop pin 34 of the blinker is brought into an opening 38 in the upper end of the top flange 36 of the blinker retainer, restraining the blinker against further movement relative to its retainer.

In use, the hood 10 is placed on a horse's head, either before or after the bridle is fitted, and is made fast by means of the catch 19, 20. The horse's vision will not be materially impaired by the mesh eye guards 27, which will be found to be very effective in preventing any injury to the eyes from being accidentally struck or from sand or soil thrown from the hooves of other horses in a race. Their domed construction makes them highly resistant to any deformation.

Although the eye guards 27 may be quickly and easily installed owing to the flexible and resiliently deformable nature of the edging rings 18, when the eye guards have been fitted and the hood is fastened on a horse's head there will be no likelihood of either eye guard being accidentally dislodged from the hood.

Nevertheless, when the hood is removed from the horse's head, each eye guard may be quickly and easily removed by deforming part of its edging ring 18 to release part of the eye guard base flange 28, and rotating the eye guard to wind the flange out of the edging ring.

If the blinkers 30 should not be required at any time, they also may be readily removed by a rotary motion of each through about 180°.

The easy installation or removal of the eye guards and the blinkers is a notable advantage since the one set of goggles may, and normally will, be used by several horses in different races, and also in different track conditions. In some circumstances, then, it will be desired that the blinkers be used and in other conditions that they should be removed, and likewise in some circumstances it will be desired to remove the eye guards. Also a blinker or an eye guard, if damaged, may be readily removed for repair or replacement.

The invention is applicable, of course, to goggles for animals other than horses by appropriate modification to the shape of the hood 10 and the dimensions of the hood and other parts of the goggles. The blinkers and blinker retainers may also be omitted. These and other modifications of detail and design, which will be readily apparent to skilled persons, are considered to lie within the scope and ambit of the invention hereinafter claimed.

I claim:

1. Animal goggles including:
a flexible hood with eye holes for fitting about the eyes and over the adjacent parts of an animal's head,
means for releasably securing the hood on the animal's head,
a pair of mesh eye guards,
eye guard attachment means for securing each eye guard to the hood to project forwardly from the peripheral part of each eye hole, and
blinker retainers on the hood at the outer sides of the eye holes, for releasable engagement with a pair of blinkers,
wherein each blinker retainer is of arcuate form with an arcuate recess formed in its inner periphery, and each blinker has an arcuate base flange slidably engageable in the arcuate recess of a blinker retainer, the blinker retainer and blinker being shaped for slidable tongue-and-groove interengagement.

2. Animal goggles including:
a flexible animal hood with eye holes for fitting about the eyes and over the adjacent parts of an animal's head,
means for releasably securing the hood on the animal's head,
mesh eye guards,
eye guard attachment means for releasably securing each eye guard to the hood to project forwardly from the peripheral part of each eye hole,
blinkers, and blinker retainers for releasably engaging each blinker to the hood,
wherein the respective dimensions of the eye guards and blinkers are such that the blinkers and eye guards are simultaneously attachable together or independently to the flexible hood.

3. The animal goggles of claim 2, wherein each blinker retainer is of arcuate form about its respective eye hole, with an arcuate blinker receiving means formed in its inner periphery, and each blinker has an arcuate base flange that is releasably engageable with the arcuate receiving means of its blinker retainer.

4. The animal goggles of claim 3 in which each eye guard attachment means and each blinker retainer means are an integral structure of arcuate form for fitting around the eyes of the animal.

5. Animal goggles according to claim 2, wherein each of the mesh eye guards is of domed form.

6. Animal goggles according to claim 2, wherein said eye guard attachment means includes a flexible edging ring secured about each of the eye holes, an annular recess formed from the inner periphery of each edging ring, and an attachment flange extending outwardly from the periphery of each eye guard and releasably engageable in the annular recess of an edging ring.

7. Animal goggles according to claim 2 wherein said means for releasably securing the hood to an animal's head include holes in the hood to accept the animal's ears, straps extending from the sides of the hood, and a catch for releasably and adjustably connecting the straps under the animal's head, at least one of the straps being elastic.

* * * * *